Patented May 13, 1952

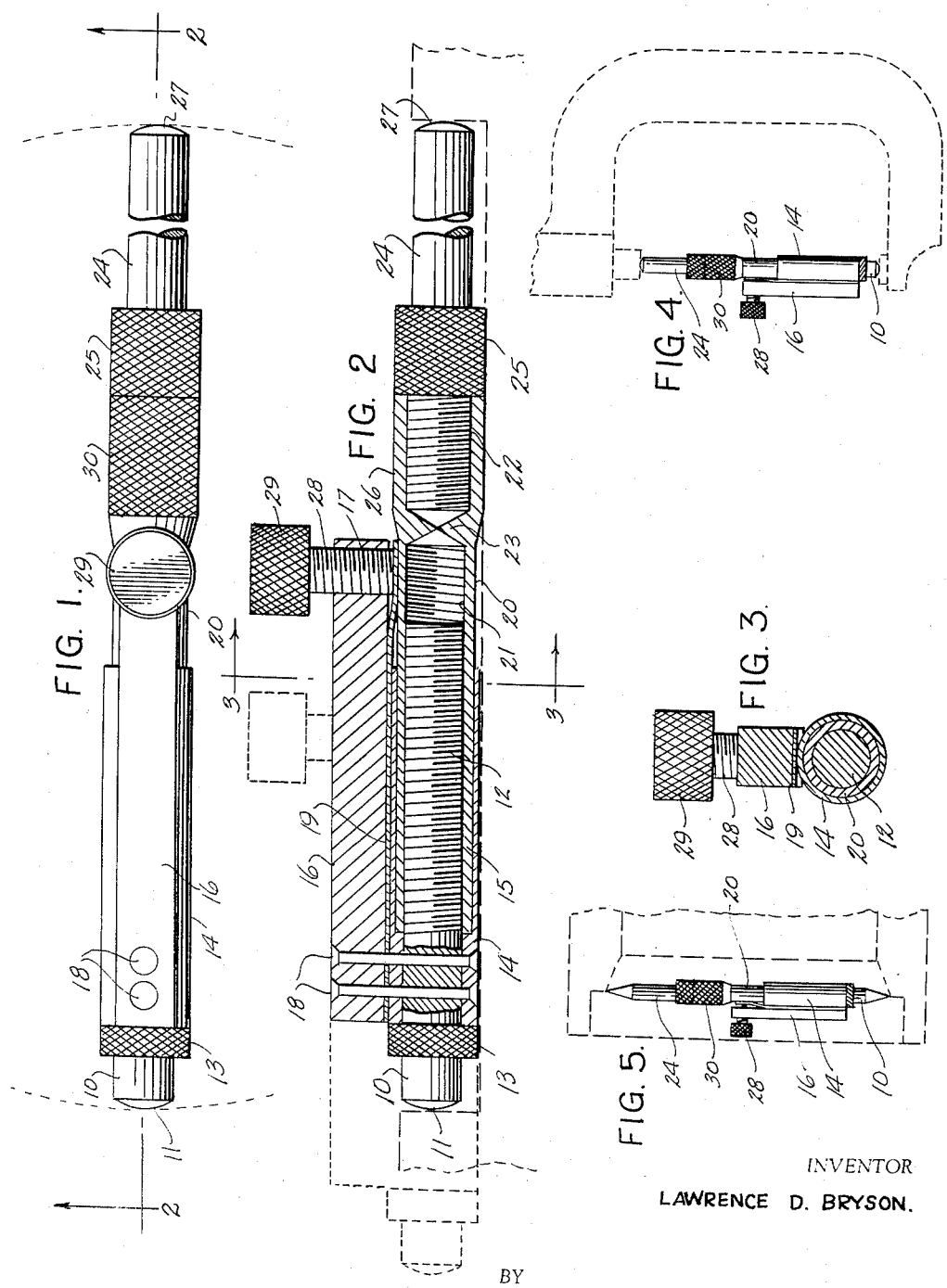

2,596,204

UNITED STATES PATENT OFFICE 2,596,204

ADJUSTABLE GAUGE

Lawrence D. Bryson, Connellsville, Pa.

Application April 14, 1950, Serial No. 155,976

1 Claim. (Cl. 33—164)

This invention relates to adjustable gauges and more particularly to an adjustable gauge for measuring the distance between two mutually opposed surfaces or the inside diameters of hollow bodies.

It is among the objects of the invention to provide an improved adjustable gauge having interchangeable parts for accommodating the gauge to different ranges of measurement, which gauge is easily adjustable to accurately measure the distance between two mutually opposed surfaces or the inside diameter of a hollow body and can be manually locked in adjusted position for transferring the measurement obtained to a micrometer caliper or equivalent gauge, which can be used in spaces inaccessible to inside micrometer gauges now available and can be used to measure inclined internal surfaces such as beveled shoulders and counterbores, and which is simple and durable in construction, economical to manufacture, easy to use, and positive and accurate in operation.

Other objects and advantages will become apparent from a consideration of the following description and the appended claim in conjunction with the accompanying drawing wherein:

Figure 1 is a side elevational view of an adjustable gauge illustrative of the invention;

Figure 2 is a longitudinal cross sectional view on the line 2—2 of Figure 1;

Figure 3 is a transverse cross sectional view on the line 3—3 of Figure 2;

Figure 4 is a somewhat diagrammatic illustration showing the gauge in side elevation and illustrating the manner in which a measurement obtained by the gauge is transferred to a micrometer caliper or equivalent measuring device; and Figure 5 is a somewhat diagrammatic illustration showing in side elevation a somewhat modified form of gauge and illustrating the manner in which the gauge is used to obtain the measurement of the diameter of a bore in a hollow body.

With continued reference to the drawing, the improved gauge comprises a first elongated pin 10 of cylindrical shape having a convexly rounded end surface 11 at one end and having an externally screw threaded portion 12 terminating at the opposite end of the pin. A knurled collar formation 13 is formed on the pin 10 surrounding the latter adjacent the end of the pin provided with the convex surface 11.

The pin 10 is received in a cylindrical sleeve 14 with the side of the collar 13 remote from the end surface 11 contacting the adjacent end of the sleeve 14. The sleeve 14 extends longitudinally of the pin 10 to a location near the end of the screw threaded portion 12 and is provided along the screw threaded portion 12 with a counterbore 15 so that the screw threaded portion 12 of the pin 10 is circumferentially spaced from the portion of the sleeve 14 surrounding such screw threaded portion of the pin.

An elongated bar 16 of rectangular cross sectional shape extends along the sleeve 14 from the end of the sleeve adjacent the knurled collar 13 past the opposite end of the sleeve and is provided at its end adjacent such opposite end of the sleeve with a tapped hole 17.

The pin 10, the sleeve 14 and the bar 16 are transversely apertured near the end of the sleeve adjacent the collar 13 and two spaced apart, substantially parallel rivets 18 extend transversely through the pin 10, the sleeve 14 and the bar 16 adjacent the knurled collar 13 to rigidly secure the pin, the sleeve and the bar together at this end of the gauge. An elongated flat spring 19 is disposed between the bar 16 and the sleeve 14 and extends beyond the end of the sleeve 14 remote from the knurled collar 13 to provide a locking tongue for a purpose to be later described.

A second sleeve 20 provided with two screw threaded bores 21 and 22 opening to respectively opposite ends of the sleeve and separated by a transverse wall 23 in the sleeve, is telescopically received at one end in the sleeve 14 with the screw threaded portion 12 of the pin 10 threadedly received in the bore 21 of this second sleeve.

A second pin 24, of cylindrical shape, is provided intermedate its length with a knurled collar 25 and has at one side of the collar 25 a screw threaded portion 26 threaded into the bore 22 of the sleeve 20. The pin 24 extends outwardly from the side of the collar 25 opposite the adjacent end of the sleeve 20 and is provided on its opposite end with a convexly rounded surface 27.

Pins 24 may be provided in sets of different predetermined lengths and may be selectively assembled with the sleeve 20 to condition the gauge for different ranges of measurement.

A locking screw 28 having a knurled head 29 on one end thereof is threaded through the tapped hole 17 in the bar 16 and bears at its inner end on the tongue provided by the flat spring 19 to force this tongue into locking engagement with the outer surface of the sleeve 20 to secure the sleeve 20 against rotation relative to the pin 10 and thereby lock the gauge in adjusted position.

The portion of the sleeve 20 surrounding the bore 22 may be externally knurled, as indicated at 30, to facilitate the interchange of the pins 24.

In using the gauge to measure the diameter of the internal bore of a hollow body, as indicated by the dotted arcuate lines at each end of the gauge in Figure 1, the gauge with a pin 24 of proper length therein is placed within the bore of the body in a position to extend diametrically of the bore and, with the screw 28 loosened the knurled shoulders 13 and 25 are manually rotated in opposite directions until the outer ends of the pins 10 and 24 contact the internal surface of the body. The screw 28 is then tightened to lock gauge in its adjusted condition and the length of the gauge between the outer ends of pins 10 and 24 is then measured in a device such as the micrometer caliper illustrated in dotted lines in Figure 4.

Where the gauge is to be used for measuring sharp edges, such as the edge of a shoulder at the end of a counterbore in a body, as illustrated in Figure 5, the pins 10 and 24 may be pointed at their outer ends, as illustrated in Figure 5, to obtain an accurate measurement of the diametrical dimensions of such edges.

The invention may be embodied in other specific forms without departing from the spirit or essential characteristics thereof. The present embodiments are, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

An adjustable gauge comprising a first elongated sleeve, a first elongated pin disposed in said first sleeve and projecting from one end of the first sleeve, a bar extending along said first sleeve beyond the other end of the first sleeve, means rigidly interconnecting said first sleeve, said first pin and said bar at said one end of said first sleeve, said first pin having a screw threaded portion within and circumferentially spaced from said first sleeve, a second sleeve telescopically received in said first sleeve and threaded onto said first pin, a second pin threaded into said second sleeve and projecting from one end thereof in opposition to said first pin, a resilient tongue disposed between said first sleeve and said bar and projecting from said other end of said first sleeve to a location between said bar and said second sleeve, said bar having a tapped hole therein overlying the portion of said tongue between said bar and said second sleeve, and a locking screw threaded through said tapped hole and bearing against said tongue to force the latter into locking engagement with said second sleeve and preclude relative rotation of said second sleeve relative to said first sleeve and said first pin, said second sleeve being rotatable relative to said first pin upon loosening of said locking screw for adjustably varying the length of the gauge.

LAWRENCE D. BRYSON.

REFERENCES CITED

The following references are of record in the file of this patent:

UNITED STATES PATENTS

| Number | Name | Date |
| --- | --- | --- |
| 347,844 | Usher | Aug. 24, 1886 |
| 368,563 | Brown | Aug. 16, 1887 |
| 746,622 | Wold | Dec. 8, 1903 |
| 821,721 | Kreutzkamp | May 29, 1906 |
| 1,628,741 | Ritchey et al. | May 17, 1927 |
| 2,402,715 | Warner | June 25, 1946 |